Figure 3:
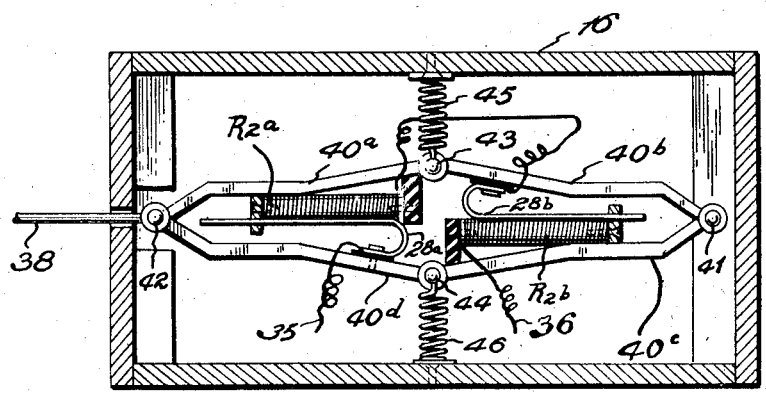

May 12, 1942.  L. T. E. THOMPSON  2,282,438
MILES PER GALLON GAUGE
Filed Dec. 7, 1938  2 Sheets-Sheet 1
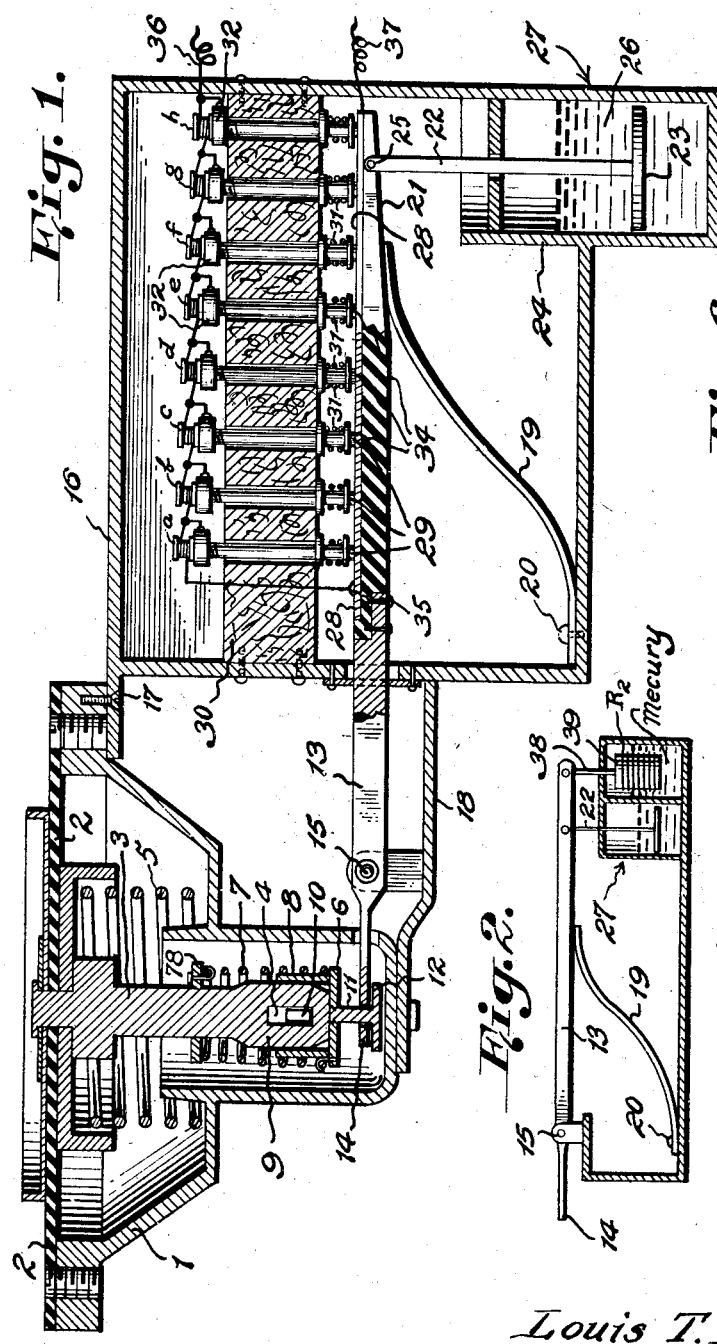
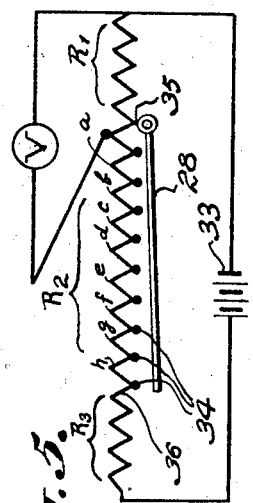
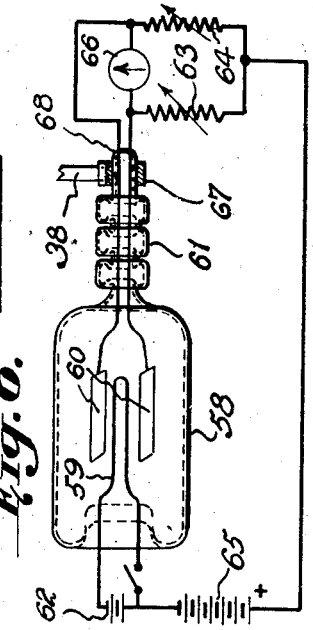
INVENTOR:
*Louis T. E. Thompson*
BY *Henry C. Parker*
ATTORNEY May 12, 1942.　　　L. T. E. THOMPSON　　　2,282,438
MILES PER GALLON GAUGE
Filed Dec. 7, 1938　　　2 Sheets-Sheet 2

INVENTOR:
Louis T. E. Thompson
BY
Henry C. Parker
ATTORNEY

Patented May 12, 1942

2,282,438

UNITED STATES PATENT OFFICE 2,282,438

MILES PER GALLON GAUGE

Louis T. E. Thompson, Dahlgren, Va.

Application December 7, 1938, Serial No. 244,481

16 Claims. (Cl. 73—51)

This invention relates to miles per gallon gauges; and it comprises a gauge which, when installed in the fuel line of an automobile, is capable of measuring instantaneous miles per gallon. This gauge comprises in combination a diaphragm fuel pump, in which the diaphragm pulsates at a rate directly proportional to the rate of travel of the automobile, the amplitude of the pulsations being substantially directly proportional to the volume of flow of fuel, means connected to said diaphragm in such manner that the displacement of said means at any instant from its normal, no-flow position is a measure of the amplitude of said pulsations and means including an indicator for converting the said displacements into a reading of miles per gallon; a means for amplifying said displacements being usually introduced between said diaphragm and said indicator; all as more fully hereinafter set forth and as claimed.

While there has long been a demand for a fool-proof gauge for automobiles for measuring the instantaneous value of miles traveled per gallon of gasoline consumed and while a large number of different devices for this purpose have been proposed, to date no wholly satisfactory means for this purpose has been developed. Most of the prior devices of this nature which have been proposed are capable of giving readings which represent only a more or less average value of miles per gallon for the reason that the volume of fuel consumed is measured by the filling and emptying of an auxiliary tank and the speed of the car may have varied considerably during the interval required for this auxiliary tank to empty. Others have suggested obtaining a measurement of rate of flow by means depending upon the differential pressure in the fuel line, etc. Most of these prior are devices have been much too complicated and expensive to be practical.

I have found that a very simple miles per gallon measurement can be obtained merely by measuring the amplitude of the displacements of the diaphragm of the usual gasoline pump, which is used in automobiles, from its null or no-flow position. During the normal operation of an automobile this diaphragm vibrates many times per second between a point representing its lowest or no-flow position and a point representing its maximum displacement from its lowest position. The distance between the diaphragm's no-flow position and its maximum displacement can be considered its stroke and this stroke is, at any instant and for a given gear ratio, directly proportional to instantaneous miles per gallon and can therefore be used to measure this quantity. This fact can be readily shown.

In the usual automobile gasoline pump the diaphragm is driven by a coupling arm connected to the main drive shaft in such manner that the diaphragm is pulsated at a rate directly proportional to the rate of travel of the automobile. This statement applies while the gear ratio is constant, for example, while the automobile is operating at is third or high speed. The quantity of gasoline $q$ delivered to the engine at each stroke is evidently directly proportional to the length of stroke $l$ of the diaphragm and the total gasoline delivered is evidently directly proportional to $l$ multipled by the number of strokes $n$. Therefore we can write:

I $\qquad q = f \cdot l \cdot n$ where $f$ is a constant or a proportionality factor. But the distance $s$ travelel by the car is also proportional to $n$, hence we can write:

II $\qquad s = c \cdot n$ where $c$ is another constant. But to obtain miles per gallon $x$ it is evident that $s$ must be divided by $q$, hence $$x = s/q = \frac{c \cdot n}{f \cdot l \cdot n}$$

or $$x = \frac{k}{l}$$

where $k$ is a constant equal to $c/f$. It is therefore evident that miles per gallon $x$ is inversely proportional to the length of stroke $l$ of the diaphragm of the fuel pump at any instant and for any one gear ratio. Hence, if it is possible to produce deflections of a guage index which are directly proportional to the length of stroke of the fuel pump, it is possible to calibrate this gauge in miles per gallon.

While the above discussion applies only to the case in which a single gear ratio is used in the automobile, it is evident, of course, that the indicator of my gauge can be calibrated to correspond to any of the gear ratios employed in the automobile. It is also possible to provide the indicator with a plurality of scales corresponding to the different gear ratios of the automobile.

It is evident from the above description that an important feature of the present invention resides in the fact that the indicator shows exactly how the value of miles per gallon varies with the speed of the car. The most economical speed at which to drive the car can be readily determined. This represents an important safety feature since it is known that gasoline consumption per mile rapidly increases at high speeds. With an automobile equipped with my gauge there will be a tendency for the driver to proceed at the safer and more economical speeds. The prior art gauges for measuring miles per gallon are not as well adapted to this purpose.

Owing to the fact that, during normal operation of an automobile, the length of stroke or maximum displacement of the fuel pump diaphragm from its lowest (no-flow) position is only of the order of a few hundredths of an inch, the mechanism used for measuring this displacement must be of a type capable of measuring very minute distances. It will be noted that the maximum excursions of the diaphragm from its lowest position must be measured rather than its position at any instant. This can be accomplished mechanically by providing what may be called a floating link connection with the diaphragm which is raised by the diaphragm and which floats in its raised position, tending to fall, that is, to return to its lowest position only slowly. I usually provide for this purpose a link attached to the pump diaphragm by means of a sliding or flexible connection, said link usually being connected with a dash pot to produce the floating effect.

Owing to the fact that the pump diaphragm is pulsated with great rapidity under normal operating conditions the floating link described can be maintained in its raised or floating position without difficulty by means of a dash pot. The displacement of this link from its lowest position is then a measure of miles per gallon. This displacement, although extremely small, can be measured by various conventional means with reasonable accuracy. For this purpose it is only necessary to provide a means so constructed and arranged as to convert the motions of the described floating link into readings on an indicator which readings can be calibrated as miles per gallon. There are several well known devices by means of which this can be accomplished.

One of the more simple devices which can be used to measure the displacements of the floating link described above is the so-called testing gauge commonly used in the machine shop for detecting minute irregularities in surfaces. These gauges are capable of indicating displacements as small as 0.001 inch. They are provided with measuring plungers which, if desired, can be coupled directly to the pump diaphragm of a fuel pump by means of the floating link connection described above. It is also possible, of course, to measure the displacements of the floating link by electrical means, which in simplest form may comprise an electrical contact mounted on the floating link, said contact moving over one or more resistance units. Mechanical, electrical or fluid means or combinations thereof can be used for this purpose.

If it is desired to provide a reading of miles per gallon on an instrument located on the dash board, it is, of course, necessary to provide some type of connection leading from the floating link to the instrument. This connection, obviously, may be electrical, mechanical or fluid, as will be understood by those skilled in the art.

My invention can be described in greater detail by reference to the accompanying drawings which show, more or less diagrammatically, several assemblies of apparatus elements which can be used, within the purview of this invention, to measure instantaneous miles per gallon.

Figure 8:
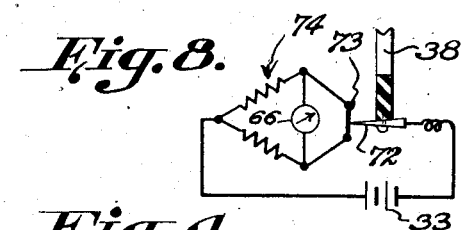
Figure 4:
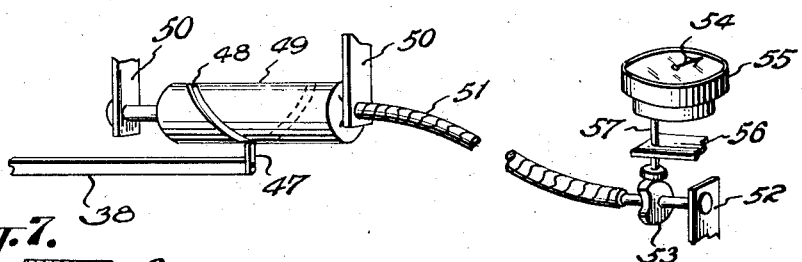
Figure 7:
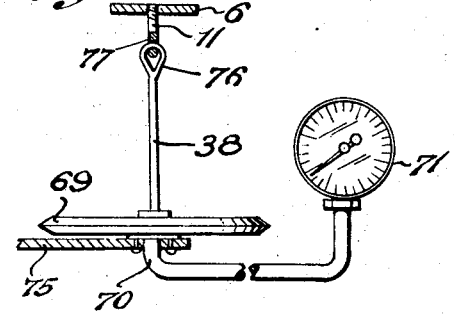

In this showing,

Fig. 1 is a vertical section through the lower part of an automobile fuel pump and through one modification of this invention in which a combined electrical and mechanical system is employed for measuring instantaneous miles per gallon, Fig. 2 shows a modified mechanical and electrical system in which an electrical resistance is varied by immersing it in a well of mercury, the variations of this resistance being in accordance with the displacements of a floating link connection, Fig. 3 shows another type of combined mechanical and electrical system in which resistance units are used which are provided with spring contactors, a modified type of amplifying means being provided, Fig. 4 shows a purely mechanical system with a flexible cable to transmit the displacements of the diaphragm to the dash board, Fig. 5 is a wiring diagram which can be used in connection with the modification shown in Fig. 1, for example, Fig. 6 shows a purely electrical amplifying and transmitting system, Fig. 7 shows a purely fluid amplifying and transmitting system, while Fig. 8 shows a very simple form of an electrical system with a modified floating link.

In the various figures like parts are represented by like reference numerals. Referring to Fig. 1, the lower part of the casing of the usual automobile fuel pump is shown at 1, while the pump diaphragm is indicated at 2. A housing is provided for enclosing the electrical elements and connection, this housing being attached to the pump casing by screws 17 and the strap 18. The diaphragm of the fuel pump is operated and mounted in the usual manner by means including the pedestal 3 having the usual slot 4 for receiving the driving link 10 which is connected indirectly to the main drive shaft of the automobile and is operated at a rate directly proportional to the speed of the automobile, for any one gear ratio.

The diaphragm and related parts are shown in Fig. 1 in their lowest or no-flow position but during operation of the automobile the pedestal 3 and therefore the diaphragm 2 is raised from this lowest position in a series of rapid pulsations which serve to pump fuel to the engine. The driving link is connected to the pedestal 3 in such manner that it tends to force the diaphragm downwardly only, the diaphragm being raised by the spring 5 when the pressure in the fuel line decreases as a result of fuel consumption; that is the height to which the diaphragm is raised at each pulsation is determined by the pressure in the fuel line. Obviously this height or maximum displacement of the diaphragm from its lowest position determines the stroke of the diaphragm and therefore the quantity of fuel supplied to the engine. And, for the purposes of this invention, some means of measuring these maximum displacements or the length of stroke of the diaphragm must be employed.

The means for measuring the length of stroke of the pump diaphragm must be attached to the pump elements in such fashion that it is coupled to the diaphragm and is driven thereby. I have found it convenient to couple this means to the lower part 9 of the pedestal 3 through a slip or flexible connection. The latter type of connection is important owing to the fact that at certain times during the operation of an automobile, for example when the automobile is started, the pump diaphragm may be temporarily raised to a height which is considerably above its normal operating range. Such excursions of the diaphragm, of course, have no significance with respect to instantaneous miles per gallon. But it is usually necessary to employ some means of preventing these wide excursions of the diaphragm from affecting the operation of the miles per gallon gauge and also from causing damage to the measuring equipment.

The flexible connection shown in Fig. 1 includes a collar 78, which is pinned or otherwise secured to the pedestal 3, and a base plate 6. These elements are normally held in the positions shown in the figure by the spring 7, which is secured to the base plate 6 and to the collar 78. The upper part of the base plate carries a guide sleeve 8 having a sliding fit with the enlarged lower end 9 of the pedestal. It is evident from the construction shown that, at the time of any excessive upward movement of the pedestal, the base plate 6 can be prevented from following such an upward movement by being held against the action of the spring 7. This safety feature prevents possible damage to the rest of the apparatus.

A depending rod 11 is attached centrally to the bottom of the base plate 6 and this rod is provided with a foot plate 12. The floating link 13, which in the modification of Fig. 1 is in the form of a lever, is pivoted at 15 and is bored at its forward end 14 to receive the rod 11, making a sliding connection therewith. In the relative positions of the parts shown in Fig. 1 the forward end 14 of the link 13 rests against the foot 12. During the operation of the car, however, the foot plate 12 normally follows the rapid upward and downward motions of the pedestal 3 and therefore strikes against the end 14 of the link 13 raising this from its normal or no-flow position which is shown in the figure. The floating link tends to return to its no-flow position owing to the action of the spring 19 which is secured at 20 to the inside of the housing 16 and bears against the rear end 21 of the link 13. The forward end portion 14 of the link is advantageously made stiff but slightly flexible and is mounted in the pump casing in such manner that it strikes against the edge of the housing which thus serves as a stop to prevent any further upward movement. Thus two safety features are provided to prevent injury to the apparatus from the infrequently occurring wide excursions of the pump diaphragm. Either the slip connection or the flexible link portion can be employed alone, if desired.

The rear end 21 of the link 13 is connected to a dash pot shown generally at 27. This dash pot comprises the piston 23 suspended by rod 22 in the cylinder 24 which is formed in the casing 16. This cylinder is filled with oil 26 or other fluid. The piston rod 22 is pivotally attached at 25 to the rear end 21 of link 13. Owing to the fact that this dash pot is connected to the link 13, the motions of this link are very sluggish in comparison with the motions of the pump diaphragm and the foot plate 12 which operates the link. The forward end 14 of the link, therefore, after being raised by the action of the foot plate 12 does not follow the foot plate on its return towards its lower position before it receives another upward impulse on the next upward excursion. The forward end of the link therefore may be said to "float" in an upper position to which it is forced by the maximum excursions of the foot plate 12 but not beyond these maximum excursions. Thus this floating position of the link is evidently determined by the length of stroke of the diaphragm, that is, the stroke of the diaphragm is measured by the distance between the floating position of the link and its lowest or no-flow position. And, as indicated previously, this distance is a measure of instantaneous miles per gallon. It is therefore only necessary to measure the displacements of this floating link 13 on some type of an indicator which then can be calibrated in the desired units. There are obviously many ways in which this can be accomplished.

In Fig. 1 the position of the floating link 13 is measured by electrical means. The rear end 21 of the floating link 13 is made of insulating material, as indicated in the drawing, and on top of this insulation there is secured a contact bar 28. This contact bar cooperates with a series of 8 contact pins 29 which are slidably mounted in a block 30 of insulating material which is secured to the housing 16 at both ends. These contact pins decrease in length progressively towards the rear end of the floating link. The springs 31 tend to force the contact pins downwardly against the contact bar 28 until the heads 32 of the pins strike the top of the block 30. The heads 32 act as stops to limit the motion of the pins 29. These heads are threaded on to the tops of the contact pins and are therefore adjustable in height. It is evident from the construction shown in Fig. 1 that, as the forward end of the floating link is raised, during the operation of the automobile, for example, the rear end becomes depressed and the electrical contacts produced by the lower ends of the contact pins and the contact bar are broken successively starting from the right end of the figure. If the rear end of the floating link is depressed sufficiently all of these contacts will be broken. It is evident that this series of contact can be connected in various electrical circuits capable of detecting and indicating how many contacts are broken and how many are closed and that such circuits are therefore capable of measuring instantaneous miles per gallon.

One simple electrical circuit, which can be used in combination with the series of contacts shown in Fig. 1, is shown in Fig. 5. A battery 33 is connected in series with three resistances $R_1$, $R_2$, and $R_3$. $R_1$ and $R_3$ are fixed but $R_2$ varies with the position of the contact bar 28, which corresponds to the contact bar 28 of Fig. 1. It is evident that, as the contact bar of Fig. 5 is raised or lowered a series of contacts 34 is made or broken successively, this causing the resistance of $R_2$ to vary. $R_2$ is broken up by these contacts into a series of smaller resistances $a$ to $f$. These smaller resistances $a$ to $f$ may be mounted as coils on top of the contact pins as shown in Fig. 1. The coils $a$ to $f$ are connected in series as shown in Fig. 1, the end of each coil being connected to a contact pin. The left end of this series of resistances (Fig. 1) is connected with the contact bar at 35 and the other end 36 is connected to a resistance $R_3$ which is shown in Fig. 5 but not in Fig. 1. The contact bar 28 (Fig. 1) is connected to a resistance $R_1$ by means of the lead wire 37, the resistance $R_1$ being shown in Fig. 5 but not in Fig. 1. A voltmeter or ammeter V is connected across $R_1$, as shown in Fig. 5, and the reading of this instrument evidently varies with the resistance $R_2$ and therefore can be used to measure the number of contacts 34 which are in circuit. This instrument can therefore be calibrated in terms of instantaneous miles per gallon and may be mounted on the dash board of the automobile.

A somewhat more simple means of varying a resistance $R_2$ in accordance with the position of the floating link 13 is shown in Fig. 2. In this modification the resistance $R_2$ is mounted on a drum 39 of insulating material, the resistance $R_2$ being partially submerged in a pool of mercury as shown. The drum 39 is pivotally suspended from the floating link 13 by means of the rod 38. It is evident that the resistance of $R_2$ will vary in accordance with the instantaneous position of the floating link and hence this resistance can be connected in the electrical circuit shown in Fig. 5 between points 35 and 36 in place of the resistances $a$ to $h$. In this case the contact bar 28 would also be omitted. The floating link 13 of Fig. 2 is provided with a dash pot 27 having the same function as the dash pot with the same reference numeral in Fig. 1.

In Fig. 3 there is shown another means for varying a resistance $R_2$ in which a mechanical amplifying means is employed. This means is mounted within the housing 16. Four links 40a to 40d are employed, these links being connected at the right to a fixed pivot 41 and at the left to a rod 38 which can be connected to the floating link 13 of Fig. 2 in place of the rod 38 of that figure for example. The pivot 42 connecting the link mechanism with the rod 38 is slidably mounted in the housing 16. The intermediate pivots 43 and 44 are attached to opposite sides of the housing by means of springs 45 and 46. The resistance $R_2$ of Fig. 5 in this embodiment is divided into two coils $R_{2a}$ and $R_{2b}$ which are connected in series and mounted on links 40a and 40c, respectively, but being electrically insulated therefrom. There are also two resilient contact bars 28a and 28b which cooperate with the resistance coils and which correspond in function to the contact bar 28 shown in Figs. 1 and 5. These contact bars are mounted at one of their ends to the ends of the resistance coils, as shown, their opposite ends being attached to but insulated from links 40b and 40d. It is evident from the construction of the links 40a to 40d that, upon movement of the rod 38 and pivot 42 to the right, the links will open and the resistance coils $R_{2a}$ and $R_{2b}$ will separate from their respective contact bars 28a and 28b. Since the contact bars in the position shown in the figure extend across and in contact with the resistance coils, the resistance of these coils is shorted and has a value of substantially zero, but when the contact bars are separated from the coils by the movement of the links, the resistance of $R_{2a}$ plus $R_{2b}$ will rapidly increase in proportion to the displacement of the bar 38 and therefore in proportion to the displacement of the floating link 13. It is therefore evident that these resistance coils can be connected in the electrical circuit of Fig. 5 between points 35 and 36 in place of resistances $a$ to $h$ and that the resulting circuit is capable of measuring instantaneous miles per gallon. The mechanism of Fig. 3 provides a convenient and simple means of multiplying the minute displacements of the diaphragm of the fuel pump to values which can be measured readily in terms of resistance values.

In Fig. 4 there is shown another embodiment of my invention which makes use of a purely mechanical means of magnifying the displacements of the diaphragm of the fuel pump. In this mechanism the rod 38, which may be attached to the floating link 13 in the same manner as the corresponding rod 38 shown in Fig. 2, is provided at its end with a tongue 47 which cooperates with a spiral groove 48 cut in cylinder 49, in a well known manner, to multiply the displacements of the rod 38 and to convert these reciprocating displacements into rotary motion. The cylinder 49 is journaled at its ends in brackets 50 and at its right end is secured to the flexible cable 51 which serves to transmit the rotating motion of cylinder 49 to the dash board, for example. The end of this cable is journaled in a bracket 52 which can be conveniently mounted in back of the dash board. A cam 53 is shown mounted close to the bracket 52 and this cam serves to transmit the motions of the flexible cable 51 to the pointer 54 of the testing gauge 55 which is mounted in the dash board and may also be supported by a bracket 56. This gauge may be of standard type and, as usual, is provided with an operating plunger 57 which, when moved even a few thousandths of an inch will cause the pointer 54 to move over a much wider distance. This gauge is usually provided with a mechanical multiplying arrangement similar to the elements 49 and 47 shown in Fig. 4. It is therefore evident that the displacements of the rod 38 will be multiplied twice in the readings of the pointer which makes the readings of the gauge very sensitive. The floating link of this embodiment is, of course, provided with a dash pot and the flexible cable employed must be one substantially free from lost motion.

In Fig. 6 there is shown an electrical means of measuring the displacements of the diaphragm of the fuel pump. The principal element of this device is the so-called Ross Gunn tube 58. This tube is evacuated and contains the filament or cathode 59 which acts as a source of electrons, as well as the two plates 60. These plates are supported by wires which pass through a glass seal 68 which is connected to the main part of the tube by the flexible glass bellows 61. The electrical circuit includes the heating battery 62 and a plate battery 65, the positive terminal of which is connected to a bridge system which is formed by the two balancing resistances 63 and 64 and the two resistances between the cathode 59 and the two plates 60. The instrument 66 measures any unbalance in this bridge circuit. The cathode 59 may be hot or cold, according to the structure of the tube.

When using the device of Fig. 6 for measuring displacements of the diaphragm of a fuel pump, a metal sleeve 67 is tightly fitted over the cylindrical portion of the glass seal 68 and this seal is connected to the rod 38 which, as before, may be connected through a floating link to the pump diaphragm. It is evident that any displacement of the rod 38 causes one of the plates 60 to approach the cathode 59 while the other plate is caused to move away from the cathode. This causes an unbalance in the bridge which is indicated by means of the instrument 66. This instrument is calibrated in terms of instantaneous miles per gallon. It is evident that a very small displacement of the rod 38 is sufficient to cause a measurable change in the current through the instrument 66. The device of Fig. 6 is thus highly sensitive.

In Fig. 7 there is shown a fluid mechanism for transmitting the displacements of the diaphragm of a fuel pump to the dash board of an automobile. This device includes an element 69 which may be either a pair of flexible discs or a bellows containing a liquid. The base of this element is secured at the bottom to a bracket 75. The top of element 69 is connected with a rod 38 which is provided with a loop 76 at its top, this loop engaging with a similar loop 77 on a rod 11 which is screwed into the bottom plate 6 of the slip connection shown in Fig. 1. The bottom of element 69 is provided with a tube 70 which connects with the Bourdon gauge 71 which is mounted on the dash board of the automobile. Any variations in the pressure of the liquid in element 69, which are caused by displacements of the pump diaphragm, are transmitted at once to the gauge. Owing to the fact that the bore of tube 70 is small, the expanding and contracting movements of element 69 are sluggish. In other words the link 38, which connects the amplifying device 69 to the pump diaphragm, tends to float in the position corresponding to the maximum instantaneous displacement of the diaphragm from its no-flow position, and this link can therefore be called a floating link. For this reason a dash pot is usually not required in this embodiment. If required, however, a dash pot can be connected to rod 38. It is usually also not necessary to provide a spring corresponding in action to the spring 19 of Fig. 1, since the element 69 usually has sufficient resilience to return to its lower or normal position without the aid of a spring, especially if this element is mounted in such manner that the upper disc is under a slight tension when in its lowest position. The gauge 71 can, of course, be calibrated in terms of instantaneous miles per gallon. If desired, the rod 38 can be connected to a floating link in the same manner as the rod 38 of Fig. 2.

In Fig. 8 I have shown a very simple form of electrical device which can be used in accordance with the present invention. In this modification a rod 38 is provided which, at its end, carries an electrical contact 72 which is insulated from the rod and which slides along a short strip of high resistance wire 73. This resistance wire forms two arms of a Wheatstone bridge which is provided with the usual instrument 66 and battery 33. The rod 38 can be connected to a floating link as in the other modifications of this invention. The operation of the modification shown in Fig. 8 is believed to be obvious from the preceding description.

While I have described what I consider to be the best modifications of my miles per gallon gauge, it is evident that various changes can be made in the specific structures which have been described without departing from the purview of this invention. For example, the various elements which I have called floating links can be made of different structures and shapes. These elements can be connected to the pump diaphragm in various ways. The indicator used on the dash board can be of several different types. If an electrical system is used for transmitting to the indicator the displacements of the floating link, it is possible to employ the usual electrical gasoline gauge as a miles per gallon gauge. In fact the same gauge can be used for both purposes with but slight modification. It is evident from the previous disclosure that various means can be employed for transmitting the displacements of the floating link to the dash board, as well as for amplifying the displacements of the floating link to values sufficiently large to be measured readily on the dial of an indicator. The rod designated by reference numeral 38 in the various figures of my drawings may in each instance be connected to a floating link in the manner shown in Fig. 2, a dash pot also being connected to the floating link. If desired a special fuel pump can be employed which is especially adapted for use with my miles per gallon gauge. It is also possible, of course, to employ my gauge with other types of fuel pumps which are operated at a rate directly proportional to the rate of travel of the automobile and in which the stroke is substantially directly proportional to the rate of flow of fuel. The words "diaphragm fuel pump" as used in the claims, therefore, is intended to include pumps of this general character. Other modifications which fall within the scope of the following claims will be immediately evident to those skilled in this art.

What I claim is:

1. An instantaneous miles per gallon gauge for automobiles and the like which comprises in combination a diaphragm fuel pump in which a diaphragm is provided to pump fuel, which diaphragm pulsates, at a rate proportional to the rate of travel of the automobile, from a base point of no-flow to a variable position representing the maximum instantaneous displacements of said diaphragm from its base point, the distance between said base point and said variable position being substantially directly proportional to the volume of flow of fuel, a link connected by means of a sliding connection with said diaphragm, means causing said link to float in a position corresponding to said maximum instantaneous displacements of said diaphragm, an indicator provided with an indicator needle, means connecting said indicator needle with said floating link for moving said needle in correlation with the movements of said link, and a scale cooperating with said indicator needle for translating the motions of said needle into readings of miles traveled per gallon of fuel consumed.

2. An instantaneous miles per gallon gauge for automobiles and the like which comprises in combination a diaphragm fuel pump in which a diaphragm is provided to pump fuel, which diaphragm pulsates, at a rate proportional to the rate of travel of the automobile, from a base point of no-flow to a variable position representing the maximum instantaneous displacements of said diaphragm from its base point, the distance between said base point and said variable position being substantially directly proportional to the volume of flow of fuel, a link connected by means of a sliding connection with said diaphragm, means causing said link to float in a position corresponding to said maximum instantaneous displacements of said diaphragm, means for amplifying the movements of said floating link, an indicator connected to said amplifying means adapted to indicate the amplified movements of said link and an indicator scale for translating the indicator readings into readings of miles traveled per gallon of fuel consumed.

3. The apparatus of claim 2 wherein said amplifying means comprises a cylinder provided with a spiral groove and a cooperating reciprocating element sliding in said groove.

4. The apparatus of claim 2 wherein said amplifying means comprises a vacuum tube having a flexible seal supporting a pair of plates.

5. A miles per gallon gauge for automobiles and the like which comprises in combination a diaphragm fuel pump in which the diaphragm pulsates at a rate directly proportional to the rate of travel of the automobile, the amplitude of the pulsations being substantially directly proportional to the volume of flow of fuel, a floating link connected to the pump diaphragm through a sliding connection in such manner that the instantaneous maximum displacements of said floating link from its normal, no-flow position are a measure of the amplitude of said pulsations, means for causing said link to float in a position corresponding to said instantaneous displacements and means including an indicator for converting the said displacements into a reading of instantaneous miles per gallon.

6. A miles per gallon gauge for automobiles and the like which comprises in combination a diaphragm fuel pump in which the diaphragm pulsates at a rate directly proportional to the rate of travel of the automobile, the amplitude of the pulsations being substantially directly proportional to the volume of flow of fuel, a floating link connected to the pump diaphragm with a sliding connection in such manner that the instantaneous maximum displacements of said floating link from its normal, no-flow position are a measure of the amplitude of said pulsations, a dash pot connected to said link adapted to damp the movements of said link and to cause said link to float in a position corresponding to said instantaneous displacements, and means connected to said link and including an indicator for converting the said displacements into a reading of instantaneous miles per gallon.

7. A miles per gallon gauge for automobiles and the like which comprises in combination a diaphragm fuel pump in which the diaphragm pulsates at a rate directly proportional to the rate of travel of the automobile, the amplitude of the pulsations being substantially directly proportional to the volume of flow of fuel, a lever connected at one end to the pump diaphragm with a sliding connection in such manner that the instantaneous maximum displacements of said lever from its normal, no-flow position are a measure of the amplitude of said pulsations, a dash pot connected to the other end of said lever adapted to damp the movements of said lever and to cause said lever to float, in a position corresponding to said instantaneous displacements and means connected to said lever and including a dash indicator for converting the said instantaneous displacements into a reading of instantaneous miles per gallon.

8. The apparatus of claim 7 wherein said means connected to said lever comprises means for varying an electrical resistance which is connected in an electric circuit which includes said indicator.

9. The apparatus of claim 7 wherein said lever is connected to said pump diaphragm through a flexible connection adapted to prevent said lever from following wide excursions of said diaphragm.

10. The apparatus of claim 7 wherein a stop in combination with a flexible connection between said lever and said diaphragm is provided for limiting the movement of said lever and preventing it from following wide excursions of said diaphragm.

11. A miles per gallon gauge for automobiles and the like which comprises in combination a diaphragm fuel pump in which the diaphragm pulsates at a rate proportional to the rate of travel of the automobile, the amplitude of the pulsations being substantially directly proportional to the volume of flow of fuel, a link connected with said diaphragm by a sliding connection and being so constructed and arranged that the instantaneous maximum displacements of the link from its normal, no-flow position measure said amplitude, means for causing said link to float in a position corresponding to said instantaneous displacements, an electrical resistance, means connected with said link for varying said resistance in accordance with the floating position of said link, an electric circuit comprising said resistance and a miles per gallon indicator connected in said circuit adapted to give a reading inversely proportional to the said displacements of said link from its no-flow position.

12. The apparatus of claim 11 wherein said link is connected to said diaphragm through a flexible connection preventing actuation of said indicator by wide, extraneous movements of said diaphragm and injury to the mechanism.

13. The apparatus of claim 11 wherein a stop and a flexible connection between said link and said diaphragm are provided to prevent actuation of said indicator by wide, extraneous movements of said diaphragm and injury to the mechanism.

14. A miles per gallon gauge for automobiles and the like which comprises in combination a diaphragm fuel pump in which the diaphragm pulsates at a rate proportional to the rate of travel of the automobile, the amplitude of the pulsations being substantially directly proportional to the volume of flow of fuel, a link connected with said diaphragm with a sliding connection and being so constructed and arranged that the instantaneous maximum displacements of the link from its normal, no-flow position measure said amplitude, means for causing said link to float in a position corresponding to said instantaneous displacements, mechanical means for amplifying the displacements of said link and electrical means including an electrically operated indicator for converting the said amplified displacements into readings of instantaneous miles per gallon.

15. A miles per gallon gauge for automobiles and the like which comprises in combination a diaphragm fuel pump in which the diaphragm pulsates at a rate proportional to the rate of travel of the automobile, the amplitude of the pulsations being substantially directly proportional to the volume of flow of fuel, a link connected with said diaphragm with a sliding connection and being so constructed and arranged that the instantaneous maximum displacements of the link from its normal, no-flow position measure said amplitude, means for causing said link to float in a position corresponding to said instantaneous diplacements, mechanical means for amplifying the displacements of said link and a mechanically operated indicator for converting said amplified displacements into a reading of instantaneous miles per gallon.

16. A miles per gallon gauge for automobiles and the like which comprises in combination a diaphragm fuel pump in which the diaphragm pulsates at a rate proportional to the rate of travel of the automobile, the amplitude of the pulsations being substantially directly proportional to the volume of flow of fuel, a link connected with said diaphragm with a sliding connection and being so constructed and arranged that the instantaneous maximum displacements of the link from its normal, no-flow position measure said amplitude, means for causing said link to float in a position corresponding to said instantaneous displacements, a vacuum tube comprising a cathode and at least one plate, means connecting said link with said vacuum tube adapted to change the relative positions of said cathode and said plate thereby varying the resistance of the electrical path between these elements in accordance with the said displacements of said link, and an electric circuit including an electrically operated indicator and said electrical path for converting the varying resistances of said electrical path into readings of instantaneous miles per gallon.

LOUIS T. E. THOMPSON.